(12) United States Patent
Lungaro et al.

(10) Patent No.: US 7,305,565 B1
(45) Date of Patent: Dec. 4, 2007

(54) SECURE, ENCRYPTING PIN PAD

(75) Inventors: James C. Lungaro, San Jose, CA (US);
Susan W. Tso, Milpitas, CA (US);
Llavanya Fernando, San Jose, CA (US); Simon Lee, Fremont, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1861 days.

(21) Appl. No.: 09/588,109

(22) Filed: May 31, 2000

(51) Int. Cl.
*H04L 9/32* (2006.01)
(52) U.S. Cl. ...................................... 713/189; 713/192
(58) Field of Classification Search ................ 713/184, 713/185, 189, 192–194; 380/200–202, 227–229, 380/239; 705/41–44, 64–65; 235/492, 380, 235/487, 435, 462.25
See application file for complete search history.

(56) References Cited

U.S. PATENT DOCUMENTS

| | | | | |
|---|---|---|---|---|
| 5,452,355 A | * | 9/1995 | Coli | ........................... 713/194 |
| 5,821,622 A | * | 10/1998 | Tsuji et al. | .................. 257/763 |
| 6,317,835 B1 | * | 11/2001 | Bilger et al. | ................. 713/194 |

FOREIGN PATENT DOCUMENTS

| | | |
|---|---|---|
| EP | 0 248 712 A1 | 12/1987 |
| EP | 0 388 571 A1 | 9/1990 |
| EP | 0 809 717 A1 | 11/1997 |
| WO | WO 98/12615 A2 | 3/1998 |
| WO | WO 98/14915 A2 | 4/1998 |
| WO | WO 98/14915 A3 | 4/1998 |
| WO | WO 00/17758 A1 | 3/2000 |

OTHER PUBLICATIONS

Fernando et al., U.S. Appl. No. 09/887,150, filed Jun. 21, 2001, entitled "A Touch Pad That Confirms Its Security."
Papas, G.G., "Encryption Pin Pad", IBM Technical Disclosure Bulletin, Oct. 1983, 26(5): 2393-2397.

* cited by examiner

*Primary Examiner*—Hosuk Song
(74) *Attorney, Agent, or Firm*—Fay Kaplun & Marcin, LLP

(57) ABSTRACT

Apparatus and methods for encrypting an identifier such as a PIN entered on a keypad. The apparatus may include a pad, an encrypting circuit adjacent the pad and a link coupling the pad and the encrypting circuit. The pad is for entering an identifier, and the circuit for encrypting the entered identifier. The pad may be a physical touch pad such as an N-wire-technology touch pad. Alternatively, the pad may be a virtual touch screen. The encrypting circuit may be a CPU along with a memory coupled to the CPU and programmed to encrypt. The CPU and programmed memory may be the first CPU programmable to encrypt the entered identifier, through which the identifier passes. The encrypting circuit may be a microcontroller programmed to encrypt. In still another variation, the encrypting circuit may be an application-specific integrated circuit (ASIC). The apparatus may include a housing that encloses the encrypting circuit and link. The housing would be resistant to access, tampering or tapping. The housing may be at least partially of chip-on-glass technology. The encrypting circuit may be embedded in the housing, as may the link. A method for encrypting an identifier includes placing a pad for entering an identifier, a circuit for encrypting an identifier and a link communicatively coupling the pad and the circuit adjacent in an access-resistant housing. An identifier is entered on the pad and communicated to the encrypting circuit. The encrypting circuit encrypts the identifier. The encrypted identifier may be forwarded for verification.

17 Claims, 4 Drawing Sheets

SECURE, ENCRYPTING PIN PAD

BACKGROUND

This invention relates to encryption circuits and to PIN pads. More specifically, this invention relates to the securing through encryption of information entered on a PIN pad.

Well established in the art of securing a financial transaction is the use of a key pad to verify that the person transacting business is in fact the rightful person authorized to perform the transaction. Many people are familiar with the personal identification numbers or "PINs" that are ubiquitous in transactions involving debit cards.

The reasoning behind PINs is that only the person authorized to use the account underlying the debit card knows the PIN for the card. As such, any person's ability to produce that PIN on demand verifies that he is in fact the person authorized to transact business using the account.

A weak link in this reasoning is the assumption that knowledge of a PIN proves that the knowledgeable person is the rightful person. A wrongful person of ill will may acquire the PIN through a number of means: She may trick the information from the rightful person. She may oversee the entry of the PIN into the pad. She may access the database of account numbers and PINs of a business that previously completed a transaction with the account. She may access the database of account numbers and PINs of the financial institution maintaining the account. At a more sophisticated level, she may intercept the transmission of the PIN information between the PIN pad on which it is entered and the computer that verifies it.

FIG. 1 illustrates a transaction-verification system 100 according to the prior art. The system 100 includes a merchant 120, alliances and partners 130, processing center 140 and service providers 1A0. The system 100 also include communications links 160, 170 and 180.

The links 160, 180 communicatively couple the merchant 120 and alliances and business partners 130. The links 170, 180 communicatively couple the alliance and partners 130 and the processing center 140. The link 180 communicatively interconnects the merchant 120, the alliances and partners 130, the processing center 140 and the service providers 1A0. The link 180 may be the Internet.

The merchant 120 includes a merchant data center 127, one or more point-of-sale (POS) platforms 126 and the communications link 128. The link 128 communicatively couples the POS system 126 and the merchant data center 127.

The POS platform 126 itself includes a cash register 1262 or the like, a keypad 1261 and a communications link 1263. The link 1263 communicatively couples the cash register 1262 and the keypad 1261.

Where a data center 130, 140, 1A0 verifies a PIN entered on the keypad 1261, the PIN information travels over several of the communications links 1263, 128, 160, 170, 180 before the data center receives the information for verification. A sophisticated malefactor may intercept the PIN information along any of these communications links.

In response, the art has evolved to encrypt or otherwise protect PIN information almost always over a communications link 160, 170 or 180 and sometimes over a communications link 128: The merchant's data center 127 encrypts the PIN before passing it on to the business partner 130, 140, 1A0 to verify.

However, the PIN information still travels unencrypted over multiple communications links. The sophisticated malefactor still may intercept PIN information along the link 1263 between the PIN keypad and the first computer system capable of encrypting the PIN information—here, the cash register 1262. The sophisticated malefactor may intercept PIN information between the cash register 1262 and the merchant's data center 127.

Accordingly, a method of securing the entry and verification of a PIN is desirable where the unencrypted PIN information virtually cannot be intercepted between its entry on a PIN pad and a first receiving computer system capable of encrypting the information.

These and other goals of the invention will be readily apparent to one of ordinary skill in the art on reading the background above and the description below.

SUMMARY

Herein are described apparatus and methods for encrypting an identifier such as a PIN entered on a keypad. The apparatus may include a pad, an encrypting circuit adjacent the pad and a link. The pad is for entering an identifier, and the circuit for encrypting the entered identifier. The link communicatively couples the pad and the encrypting circuit.

The pad may be a physical touch pad such as an N-wire-technology touch pad (where N is 4, 5, 6, 7 or other). Alternatively, the pad may be a virtual touch screen.

The encrypting circuit may be a CPU along with a memory coupled to the CPU and programmed to encrypt. The CPU and programmed memory may be the first CPU programmable to encrypt the entered identifier, through which the identifier passes.

The encrypting circuit may be a microcontroller programmed to encrypt. In still another variation, the encrypting circuit may be an application-specific integrated circuit (ASIC).

The apparatus may include a housing that encloses the encrypting circuit and link. The housing would be resistant to access, tampering or tapping. The housing may be at least partially of chip-on-glass technology.

The encrypting circuit may be embedded in the housing, as may the link.

A method for encrypting an identifier includes placing a pad for entering an identifier, a circuit for encrypting an identifier and a link communicatively coupling the pad and the circuit adjacent in an access-resistant housing. An identifier is entered on the pad and communicated to the encrypting circuit. The encrypting circuit encrypts the identifier. The encrypted identifier may be forwarded for verification.

DESCRIPTION OF THE INVENTION

Devices

A Secure, Encrypting PIN Pad

Figure 1:
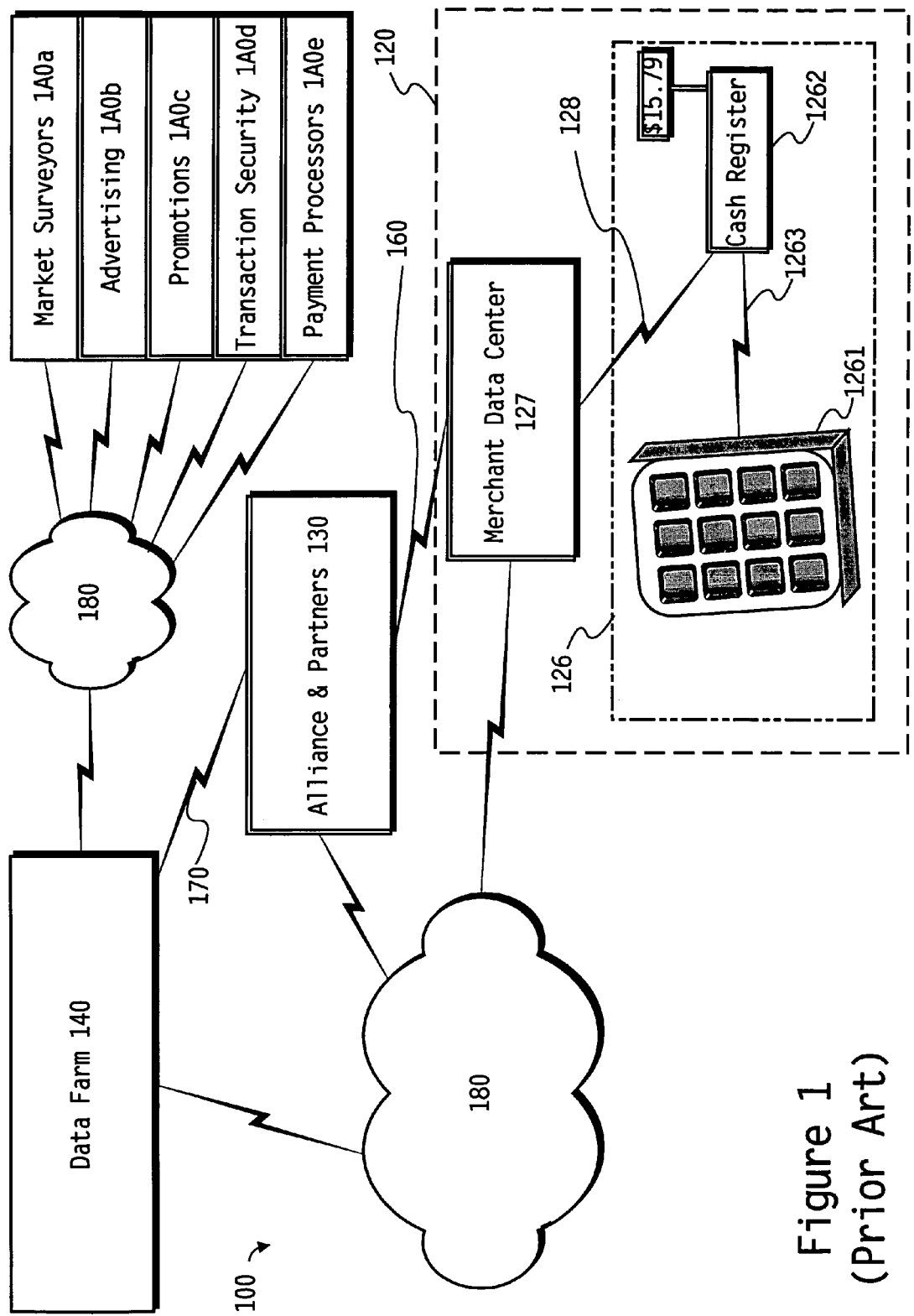
FIG. 1 illustrates a transaction-verification system according to the prior art.
Figure 2:
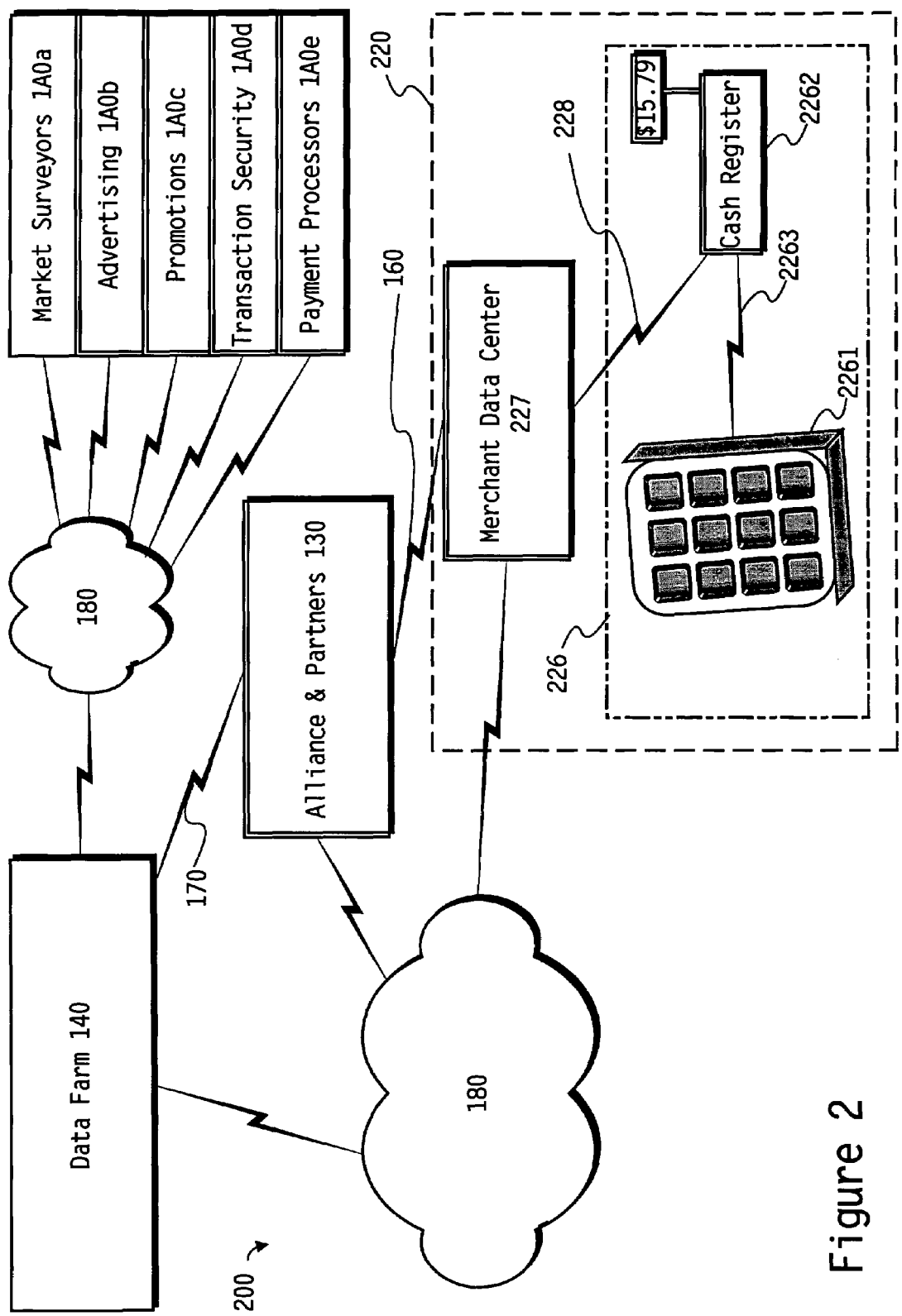
FIG. 2 illustrates a transaction system incorporating an embodiment of the invention.

FIG. 2 illustrates a transaction-verification system 200 according to an exemplary embodiment of the present invention. The system 200 includes a merchant 220, alliances and partners 130, processing center 140 and service providers 1A0. The system 200 also includes communications links 160, 170 and 180.

The links 160, 180 communicatively couple the merchant 220 and alliances and business partners 130. The links 170, 180 communicatively couple the alliance and partners 130 and the processing center 140. The link 180 communicatively interconnects the merchant 220, the alliances and partners 130, the processing center 140 and the service providers 1A0. The link 180 may be the Internet.

The merchant 220 may include a merchant data center 227, one or more point-of-sale (POS) platforms 226 and the communications link 228. The link 228 communicatively couples the POS system 226 and the merchant data center 227.

The POS platform 226 itself may include a cash register 2262 or the like, a keypad 2261 and a communications link 2263. The link 2263 communicatively couples the cash register 2262 and the keypad 2261.

Figure 3:
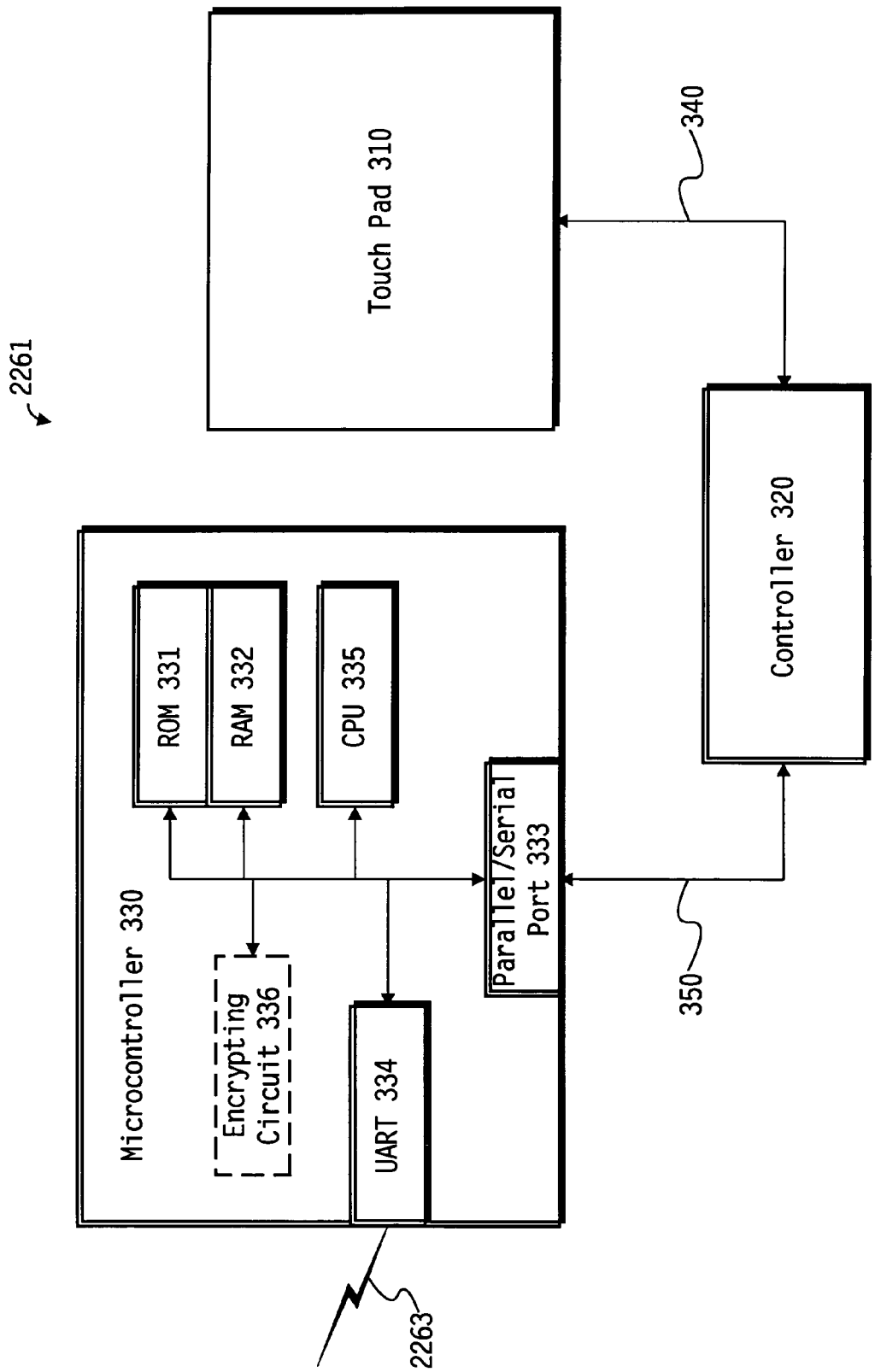
FIG. 3 is a block diagram of the components of the keypad from the transaction system of FIG. 2.

FIG. 3 is a block diagram of the component of the keypad 2261. The keypad 2261 may include a touch-pad 310, a controller 320 and a microcontroller 330, as well as the communications links 340 and 350. The link 340 communicatively couples the touch pad 310 and the controller 320, while the link 350 communicatively couples the controller 320 and the microcontroller 330.

The touch pad 310 is of any type known in the art, and therefore, further description of it is omitted—except to say that in one embodiment, the output of the touch pad 310 is consistent with one of the N-wire technologies known in the art of touch pads and that in another embodiment, the touch pad 310 is an LCD/touch-pad combination also known in the art. (N is 4, 5, 7 or some other number.)

The controller 320 contains sufficient intelligence to accept the output of the touch pad 310 and convert it into input usable by the microcontroller 330. Where the output of the touch-pad 310 is N-wire-technology output (N equals, 4, 5, 7 or other), the controller 320 produces an output representative of a sequence of positions where the touch pad 310 has been touched.

The microcontroller 330 may contain a CPU 335, a memory 331, 332, a touch-pad interface 333 and a POS-system interface 334. The memory 331, 332 of the microcontroller 330 may be programmed to perform the invention as described herein, including receiving, converting and encrypting input from the controller 320. Alternatively, the microcontroller 330 may include an application-specific integrated circuit (ASIC) or other hardware 336 for performing the encryption.

The touch-pad interface 333 may be a parallel/serial conversion port.

The microcontroller 330 may be embedded conceptually, physically or both: The microcontroller 330 may form part of a larger machine of some non-computing type, here, a keypad 2261 or a POS 226. Also, the construction of the keypad 2261 may include chip-on-glass (COG) technology, well known in the art of LCDs, wherein the microcontroller 330 and the touch pad controller 320 are embedded in glass. Where the microcontroller 330 and the controller 320 are embedded, the link 350 may be embedded. Preferably, the link 340 is embedded as much as is practicable.

Alternatively, the microcontroller 330 and the controller 320 may be embedded in the substance of the touch pad 310. That is to say, the circuitry 330, 320 may exist in the glass or the substrate of the touch pad 310 or in the (typically, plastic) housing of the touch pad 310. Again, where the circuitry 330, 320 are embedded, the link 350 may be embedded—preferably, as much as is practicable.

The embedding technology (COG or otherwise) has the advantage that the surrounding mass provides tamper-resistant protection—particularly anti-tap protection—for the microcontroller 330 and the circuitry 320 and links 340, 350 between it and the touch pad 310. Also, the adjacency (that is to say, nearness) of the microcontroller 330 to the touch pad 310 reduces the physical space to which a malfeasant may have access.

The touch pad 310 may have a flex tail for its connection 340. The flex tail may be embedded in the glass, substrate or housing of the touch pad 310.

Figure 4:
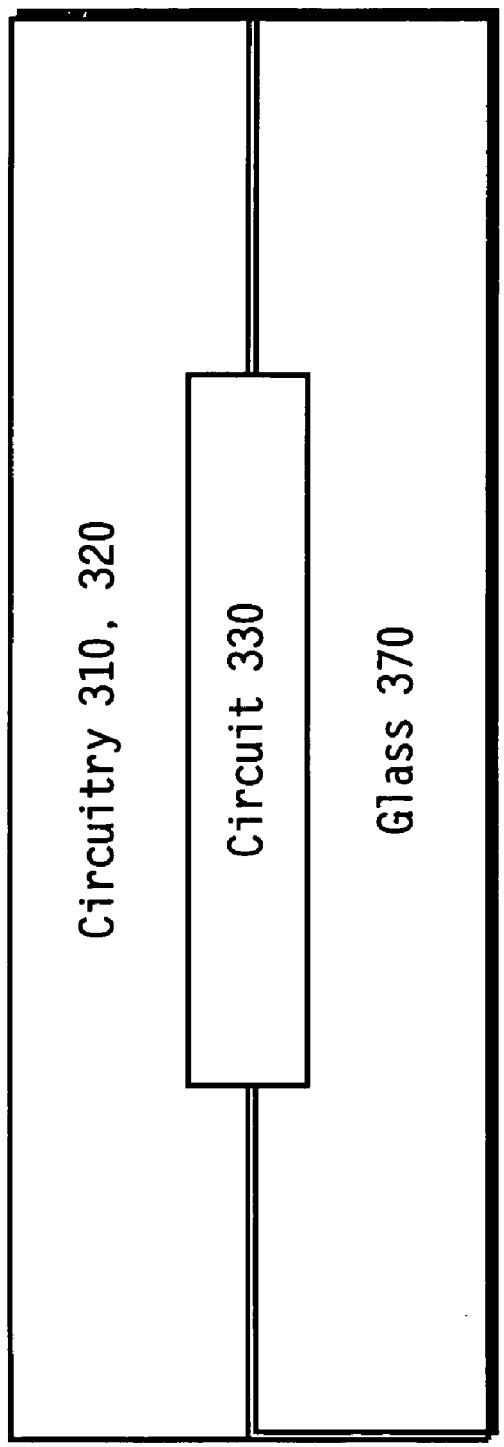
FIG. 4 illustrates physical aspects of the pin pad of FIG. 2.

FIG. 4 illustrates physical aspects of the pin pad 2261. The glass 370 and the touch pad 310 touch. The circuit 330 is sandwiched between the glass 370 and the touch pad 310. The glass is less than 0.5 inches thick and is typically 0.053 inches or less.

When a person touches the keypad, an N-wire-technology touch pad 310 generates voltages. The controller 320 converts these voltages into positional representations ("positions") and presents these positions to the microcontroller 330 on the interface 333. The microcontroller 330 converts the representations from positional to alphanumeric.

Now, with the alphanumeric PIN in its memory 331, 332, the microcontroller 330 encrypts the PIN information and forwards it to the verifying component (say, transaction-security component 1A0) of the transaction system for verification.

As is well known in the art of encryption, at least one component of the transaction system 200 knows how to decrypt the PIN information from the keypad 2261. However, some component different from the verifying component and between the keypad 2261 and the verifying component may decrypt the PIN information and re-encrypt it according to a second protocol before forwarding it to the verifying component. Alternatively, an intermediate component may doubly encrypt the PIN information, that is to say, encrypt the already encrypted PIN information (possibly according to a second protocol) before forwarding that information to the verifying component.

The invention now being fully described, many changes and modifications that can be made thereto without departing from the spirit or scope of the appended claims will be apparent to one of ordinary skill in the art. The controller 320's converting the positional information of the touch pad 310 into alphanumeric information (rather than the microcontroller's doing so) is an example. That the circuit 330 may be separate or integrated into the touch pad is another example.

What is claimed is:

1. An apparatus for encrypting an identifier, the apparatus comprising:
   a pad for entering an identifier;
   an encrypting circuit, adjacent the pad, for encrypting the entered identifier;
   a controller receiving the identifier from the pad and transmitting the encrypted identifier to a verification device;
   a first link, communicatively coupling the controller and the encrypting circuit;
   a second link, communicatively coupling the controller and the pad; and
   a housing enclosing the encrypting circuit, wherein the encryption circuit, the controller, the first link and the second link are each embedded within the housing.

2. The apparatus of claim 1, wherein the pad comprises a touch pad.

3. The apparatus of claim 2, wherein the touch pad comprises an N-wire-technology touch pad.

4. The apparatus of claim 2, wherein the touch pad comprises a four-wire-technology touch pad.

5. The apparatus of claim 2, wherein the touch pad comprises a seven-wire-technology touch pad.

6. The apparatus of claim 1, wherein the pad comprises a touch screen.

7. The apparatus of claim 1, wherein the pad comprises a pad for entering a personal identifier (PIN).

8. The apparatus of claim 1, wherein the encrypting circuit comprises a CPU; and
   a memory, coupled to the CPU and programmed to encrypt.

9. The apparatus of claim 8, wherein the CPU and programmed memory are the first CPU, programmable to encrypt the entered identifier, through which the identifier passes.

10. The apparatus of claim 1, wherein the encrypting circuit comprises a microcontroller programmed to encrypt.

11. The apparatus of claim 1, wherein the encrypting circuit comprises an application-specific integrated circuit (ASIC).

12. The apparatus of claim 1, wherein the housing comprises housing resistant to tampering.

13. The apparatus of claim 1, wherein the housing comprises housing resistant to tapping.

14. The apparatus of claim 1, wherein the housing comprises a substrate on which components of the pad are mounted, the substrate being at least partially of chip-on-glass technology.

15. An apparatus for encrypting an identifier, the apparatus comprising:
    a pad, comprising one of a touch screen and an N-wire technology touch pad, for entering a personal identifier (PIN);
    a circuit, adjacent the pad and comprising one of a programmed microcontroller and an ASIC, for encrypting the entered identifier;
    a controller receiving the identifier from the pad and transmitting the encrypted identifier to a verification device;
    a first link, communicatively coupling the controller and the controller and the encrypting circuit;
    a sceond link, communicatively coupling the controller and the pad; and
    a housing, resistant to access and at least partially of chip on-glass technology, in which the first link, the second link and encrypting circuit are embedded.

16. A method for encrypting an identifier, the method comprising:
    placing
       a pad for entering an identifier,
       a circuit for encrypting an identifier,
       a controller,
       a first link communicatively coupling the controller and the encrypting circuit adjacent in an access-resistant housing, and
       a second link communicatively coupling the controller and the pad, wherein the encrypting circuit, the controller, the first link and the second link are each embedded within the housing;
    entering the identifier on the pad;
    receiving the identifier at the controller;
    communicating the identifier from the controller to the encrypting circuit;
    encrypting the identifier by means of the encrypting circuit; and
    sending the encrypted identifier to the controller after the step of encrypting.

17. The method of claim 16, further comprising the step of forwarding the encrypted identifier for verification.

* * * * *